J. G. L. BOETTCHER.
Manufacture of Sheet-Metal Vessels.
No. 137,886. Patented April 15, 1873.
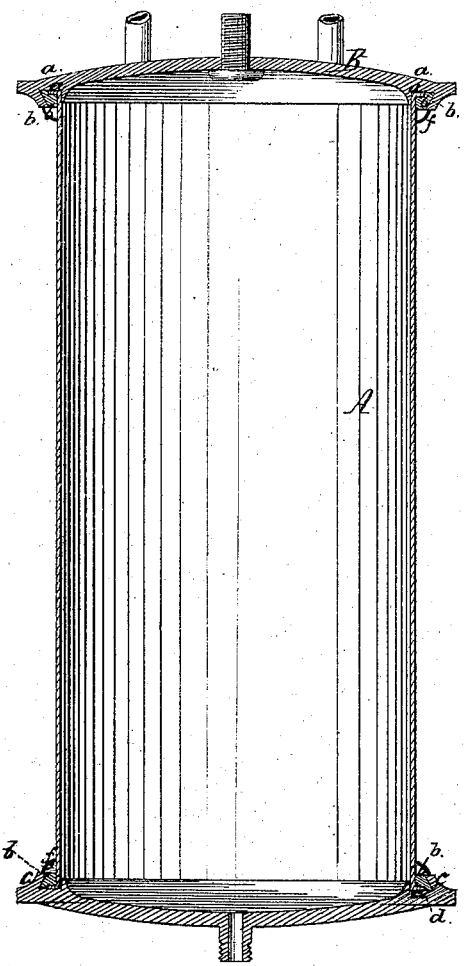
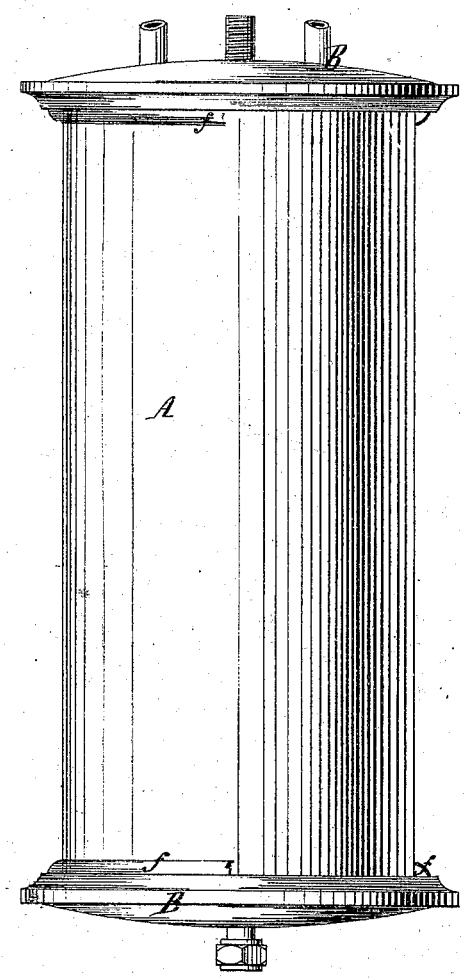

UNITED STATES PATENT OFFICE.

JOHN G. L. BOETTCHER, OF BROOKLYN, NEW YORK.

IMPROVEMENT IN THE MANUFACTURE OF SHEET-METAL VESSELS.

Specification forming part of Letters Patent No. 137,886, dated April 15, 1873; application filed January 30, 1873.

*To all whom it may concern:*

Be it known that I, JOHN G. L. BOETTCHER, of Brooklyn, in the county of Kings and State of New York, have invented a new and useful Improvement in Sheet-Metal Vessels; and I do hereby declare the following to be a full, clear, and exact description thereof, which will enable those skilled in the art to make and use the same, reference being had to the accompanying drawing forming part of this specification, in which drawing—

Figure 1 represents a vertical central section of a range-boiler constructed according to my invention. Fig. 2 is a side view of the same.

Similar letters indicate corresponding parts.

This invention consists in the arrangement of a flange, which is made to project outward from the edges of the body of a sheet-metal vessel, and which is dropped into an annular cavity in the bottom or top of said vessel, said cavity being made V-shaped at its outer rim, and filled up with tin or other suitable material, after the flanged edge of the body has been adjusted therein, in such a manner that a firm and durable connection between the bottom or top and the body of a sheet-metal vessel is produced, and the body is strengthened both against an internal and against an external pressure.

In the drawing, the letter A designates the body of a sheet-metal vessel, which is made cylindrical or in any other desirable form or shape. The edge of this body is bent to form a flange, *a*, and this flange is dropped into an annular groove, *b*, formed in the head or bottom B. This head is made of cast metal. The inner edge of the groove *b* is perpendicular, and it may be continuous or made in sections, its object being simply to retain the body A in the required position, and also to strengthen the same against an external pressure. The outer rim *c* of the groove *b* is under cut or V shaped, and after the flange *a* has been adjusted in the groove, as shown on Fig. 1, said groove is filled up with soft solder or other suitable alloy or material, and thereby a firm connection is effected between the bottom or head B and the body A. The groove *b* supports the body A both against internal and external pressure, and even if the corner of the flange *a* should be slightly damaged by the operation of bending the metal, the solder or other cement with which the groove is filled up will prevent any leakage.

My invention is designed particularly for range-boilers, and in this case both heads are secured to the body A in the manner above described; but I can use my invention with advantage for sheet-metal vessels of every description where the bottom or head is made in a separate piece from the body, and where a firm and durable connection is to be effected between said parts.

The solder which is filled into the groove *b* of the top or bottom is covered by a ring, *f*, of sheet copper or other suitable material which is slipped over the body A, and which serves to give a finished appearance to the vessel.

What I claim as new, and desire to secure by Letters Patent, is—

The heads B B, formed with a groove, as shown, the inner wall *b* being vertical and the outer wall *c* inclined or V-shaped to receive the flange *a* of the vessel A, the whole being confined in place by solder, as herein set forth, for the purpose specified.

JOHN G. L. BOETTCHER.

Witnesses:
W. HAUFF,
E. F. KASTENHUBER.